Dec. 31, 1957 G. F. KINKEAD 2,818,034
APPARATUS FOR PREPARING FOOD PRODUCTS
Filed June 5, 1956
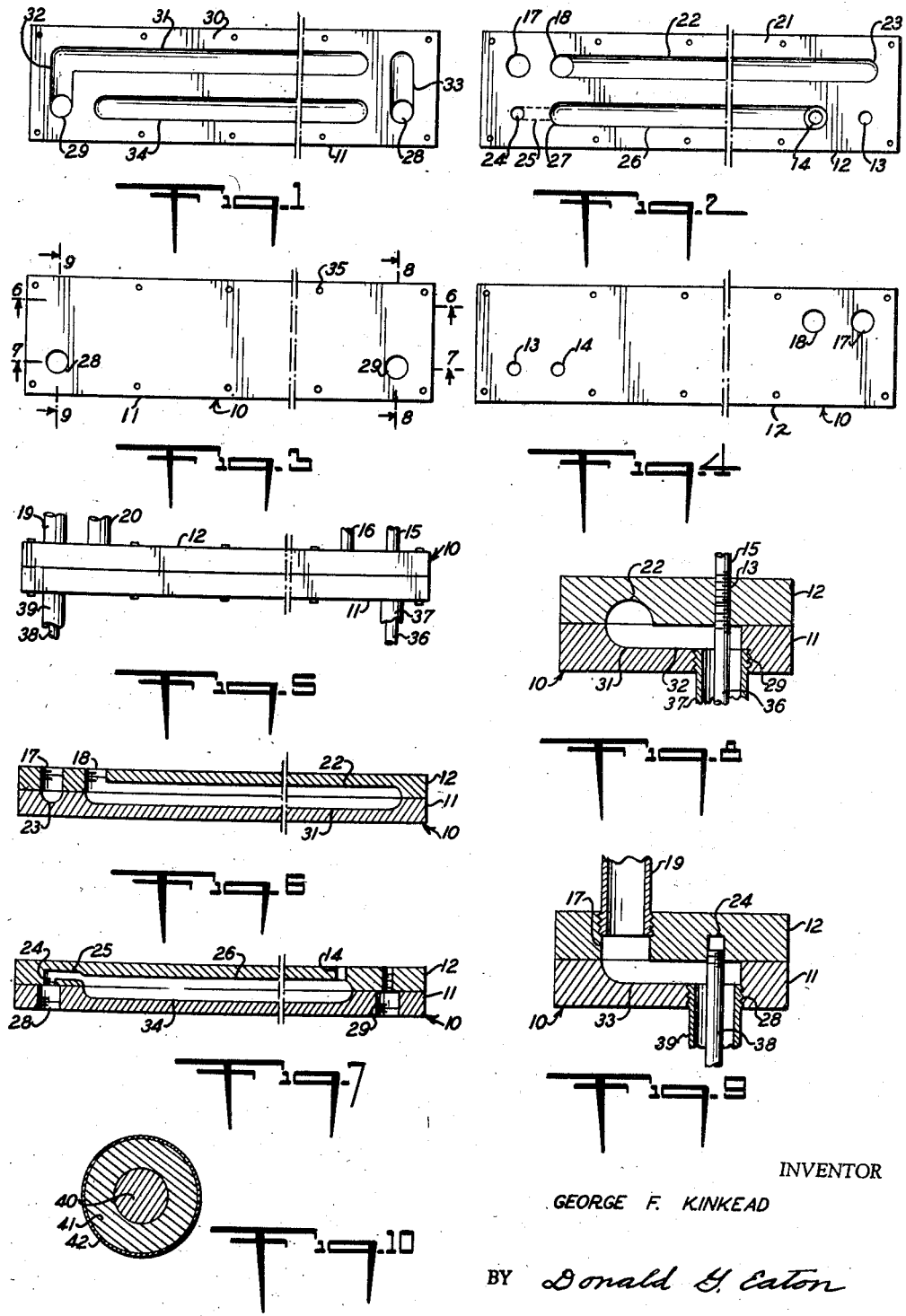
INVENTOR
GEORGE F. KINKEAD
BY Donald G. Eaton
AGENT United States Patent Office 2,818,034
Patented Dec. 31, 1957

2,818,034

APPARATUS FOR PREPARING FOOD PRODUCTS

George F. Kinkead, Louisville, Ky.

Application June 5, 1956, Serial No. 589,556

7 Claims. (Cl. 107—1)

This invention relates to food products and more particularly to an apparatus for filling tubular edible casings to provide a food product having a core of one food material and a surrounding sleeve of another food material to provide a food product of the general shape and size of a sausage link or frankfurter.

The food product produced in the apparatus of this invention is preferably composed of a core of a vegetable material, such as sauerkraut, although if desired, a dairy product, such as cheese may be used for the core and the surrounding sleeve. which together with the core is packed within an edible casing, is preferably a meat product, such as is commonly used in the making of frankfurters or similar food products. Heretofore, numerous attempts have been made to provide a food product having different types of food material therein and it has been attempted to provide a food product consisting of alternate layers of meat and cheese, but this has proved unsatisfactory, in that, upon being subjected to heat in a cooking pan, the cheese has flowed outwardly around the edges of the meat layer and has resulted in burning and sticking to the pan. This difficulty is overcome by the present invention by completely enclosing the vegetable or dairy product material as a core within the meat product and entirely surrounded thereby, the ends of the product being sealed by the edible casing which thereby prevents flow of the core material during cooking and which serves to maintain the different food products in the same relative position as prior to cooking.

It is accordingly an object of this invention to provide an apparatus for simultaneously filling a pair of tubular edible casings with two types of food products, one forming a core and the other a sleeve surrounding the core, which apparatus may be conveniently and economically manufactured from readily available materials and which may be conveniently disassembled to permit cleaning thereof, thereby maintaining the apparatus in a sanitary condition.

A further object of the invention is the provision of an apparatus for simultaneously filling a pair of tubular edible casings with two different types of food materials, with one material forming a core and the other material a sleeve surrounding the core, which apparatus includes a food material distributor which may be conveniently utilized in connection with conventional food product stuffing apparatus commonly known as sausage stuffers.

A still further object of the invention is the provision of an apparatus for simultaneously filling a pair of tubular edible casings with two different types of food material, one of which forms a core and the other of which forms a sleeve surrounding the core and in which the core and sleeve are simultaneously extruded from a food material distributor into the edible casings.

Another object of the invention is the provision of an apparatus for simultaneously filling a pair of tubular edible casings with two different types of food material, one material forming a core and the other material forming a sleeve surrounding the core, which apparatus may be utilized with conventional food packing apparatus without modification thereof and which apparatus may also be utilized to fill conventional tubular edible casings, such as are utilized for making sausages or frankfurters and without modification of such casings.

Further objects and advantages of the invention will be apparent from the following description taken in conjunction with the accompanying drawing wherein:

Fig. 1 is an elevational view showing the inner surface of the front plate of the food material distributor constructed in accordance with this invention;

Fig. 2 an elevational view of the inner surface of the rear plate of the food material distributor;

Fig. 3 a front elevational view of the food material distributor constructed in accordance with this invention;

Fig. 4 a rear elevational view of the food material distributor shown in Fig. 3;

Fig. 5 a top plan view of the food material distributor shown in Fig. 3;

Fig. 6 a sectional view taken substantially on the line 6—6 of Fig. 3;

Fig. 7 a sectional view taken substantially on the line 7—7 of Fig. 3;

Fig. 8 a sectional view taken substantially on the line 8—8 of Fig. 3;

Fig. 9, a sectional view taken substantially on the line 9—9 of Fig. 3; and

Fig. 10, a sectional view showing a food product produced by the apparatus of this invention.

With continued reference to the drawing, there is shown an apparatus constructed in accordance with this invention and which may well include a food material distributor 10 comprising a front elongated, generally rectangular plate 11 and a similar rear elongated, generally rectangular plate 12. These plates 11 and 12 may be formed of suitable material, such as stainless steel or other material which may be provided with a relatively high finish in order to permit adequate cleaning and sterilization thereof, whereby the apparatus will be maintained in a sanitary condition.

As best shown in Fig. 2, the rear plate 12 may be provided with a pair of inlets in the form of apertures 13 and 14 extending therethrough for one food material, such as sauerkraut, cheese or other desired material and conduits 15 and 16 may be connected to the apertures 13 and 14 respectively, for supplying sauerkraut or other material thereto from a suitable pressure source, such as a conventional sausage stuffer or the like. It is to be noted, that the apertures 13 and 14 are provided in the plate 12, adjacent the lower edge and inwardly of one end thereof and adjacent the opposite edge and inwardly of the opposite end of the plate 12, there may be provided a pair of inlets for the other food product, such as meat or the like, in the form of apertures 17 and 18. Apertures 17 and 18 serve to receive conduits 19 and 20 respectively, which are connected to a suitable source of meat supply, such as a conventional sausage stuffer or the like, which will supply such meat thereto, under pressure.

The inner surface 21 of the rear plate 12 is provided with a longitudinally extending channel 22 which communicates at one end with the inlet aperture 18 and terminates at the opposite end 23 above the inlet aperture 13. A recess 24 is provided in the inner surface 21 of the plate 12 below the inlet aperture 17 and recess 24 communicates through a passage 25 with a channel 26 extending longitudinally of the rear plate 12 in the inner surface 21 thereof and communicating at its opposite end with the inlet aperture 14. It is to be noted, that the inner surface 21 of the rear plate 12 between the end 27 of the channel 26 and the recess 24 is uninterrupted and that the passage 25 is disposed beneath this surface.

A best shown in Fig. 1, the front plate 11 of the distributor 10 is provided with a discharge opening 28 adjacent one end of the plate 11 and with a discharge opening 29 adjacent the opposite end of the plate 11. With the plate 11 secured in position in face to face engagement with the plate 12, as shown in Figs. 3, 4 and 5, the discharge opening 28 in the plate 11 is in alignment with the recess 24 in the plate 12 and the discharge opening 29 in the plate 11 is in alignment with the inlet aperture 13 in the plate 12. The inner surface 30 of the front plate 11 is provided with a longitudinally extending channel 31 which terminates at one end in an enlarged recess 32 communicating with the discharge opening 29. An enlarged recess 33 adjacent the opposite end of the plate 11 and at the inner surface 30 thereof, extends transversely of the plate 11 and communicates at one end with the discharge opening 28. Also provided in the inner surface 30 of the front plate 11 is a longitudinally extending channel 34. It will thus be seen, that with the front plate 11 in face to face relationship with the rear plate 12 and secured thereto by suitable fastening means 35 which may comprise screw threaded members or the like, that the channel 31 in the front plate 11 will be in registration with the channel 22 in rear plate 12 and the channel 34 in front plate 11 will be in registration with channel 26 in the rear plate 12. At the same time, the enlarged recess 33 will provide communication between the inlet aperture 17 in the rear plate 12 and the discharge opening 28 in the front plate 11. In a similar manner, the enlarged recess 32 will provide communication between the inlet aperture 18 in the rear plate 12 through the channels 22 and 31 to the discharge opening 29 in the front plate 11.

A best shown in Fig. 8, a core nozzle 36 comprising an elongated tubular member may extend through the discharge opening 29 in the front plate 11 substantially co-axial therewith and be threadedly received in the inlet aperture 13 in the rear plate 12 thereby providing communication between the inlet conduit 15 and the core nozzle 36. Surrounding the core nozzle 36 and in concentric relation thereto is a sleeve nozzle 37 comprising an elongated tubular member somewhat larger in diameter than the core nozzle 36 and the sleeve nozzle 37 may be threadedly received in the discharge opening 29 in the front plate 11 which provides communication from the sleeve nozzle 37 through the enlarged recess 32 in the front plate 11 and the channels 22 and 31 to the inlet aperture 18 in the rear plate 12.

Similarly, and with particular reference to Fig. 9, a core nozzle 38 comprising an elongated tubular member may extend through the discharge opening 28 in the front plate 11 in co-axial relation thereto and be screw threadedly received in the recess 24 in the rear plate 12 which provides communication from the core nozzle 38 through the recess 24, the passage 25 and the channels 26 and 34 to the inlet aperture 14 in the rear plate 12. Surrounding the core nozzle 38 and in concentric relation thereto is a sleeve nozzle 39 comprising an elongated tubular member threadedly received in the discharge opening 28 in the front plate 11, the sleeve nozzle 39 communicating through the enlarged recess 33 in the front plate 11 with the inlet aperture 17 in the rear plate 12 and the inlet conduit 19.

It is, of course, understood, that the core nozzle 36 is substantially the same length as the sleeve nozzle 37 and the core nozzle 38 is substantially the same length as the core nozzle 39. In operation, a suitable edible casing is placed over the sleeve nozzle 37 and a second edible casing is placed over the sleeve nozzle 39. Sauerkraut, cheese or other suitable food material is supplied under pressure, to the inlet conduits 15 and 16 and meat or other suitable food material is supplied under pressure, to the inlet conduits 19 and 20. Sauerkraut flows from the inlet conduit 15 through the inlet aperture 13 in the rear plate 12 to the core nozzle 36 and simultaneously, meat flows through the inlet conduit 20, the inlet aperture 18 in the rear plate 12 and the channels 22 and 31 to the enlarged recess 32 in the front plate 11 to the discharge opening 29 in the front plate 11 and through the sleeve nozzle 37. At the same time, sauerkraut will flow through the inlet conduit 16 to the inlet aperture 14 in the rear plate 12 and through the channels 26 and 34 to the passage 25 and into the recess 24 in the rear plate 12 from which the sauerkraut will flow through the core nozzle 38. Simultaneously therewith, meat will flow through the inlet conduit 19 and the inlet aperture 17 in the rear plate 12 through the enlarged recess 33 in the front plate 11 to the discharge opening 28 and through the sleeve nozzle 39.

This operation will result in simultaneously filling the edible casing on the sleeve nozzle 37 and 39 with a food product consisting, as best shown in Fig. 10, of a core 40 of sauerkraut, cheese or other suitable food material of substantially the same diameter as the inner diameters of the core nozzles 36 and 38 and surrounded by a sleeve 41 of other food material, such as meat and having an outer diameter substantially equal to the inner diameters of the sleeve nozzles 37 and 38. The sleeve 41 is surrounded by the edible casing 42 and such casing may, if desired, of course, be tied at suitable intervals to provide links or frankfurters of the desired length and weight. It will be seen that in the resulting product, the core 40 is entirely surrounded by the sleeve 41 and that the core 40 and sleeve 41 are sealed at the ends by the casing 42 which also completely surrounds the sleeve 41. There is thus provided a food product which may be conveniently cooked or otherwise prepared for eating without flow or leakage of the material forming the core 40 from within the casing 42.

As stated above, the food material distributor of this invention may be supplied with food material under pressure, from suitable apparatus, such as conventional sausage stuffers or the like, and furthermore, the distributor may be conveniently cleaned and sterilized merely by removing the fastening means 35 and separating the front and rear plates 11 and 12, whereupon the channels, recesses and nozzles may be flushed with water or any suitable solution and the entire distributor thereafter exposed to a steam blast or sterilized in any other desired manner to maintain the same in a sanitary condition. Upon reassembly of the plates 11 and 12 by insertion of the fastening means 35, the apparatus is again in condition for operation.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. Apparatus for simultaneously filling a pair of tubular casings to provide a food product in each casing having a core of one food material and a surrounding sleeve of another food material, said apparatus including a food material distributor comprising front and rear elongated generally rectangular plates detachably secured together in face to face relationship, said rear plate having a pair of inlets for said one food material comprising first and second apertures adjacent the lower edge and inwardly of one end, said rear plate having a pair of inlets for said other food material comprising third and fourth apertures adjacent the upper edge inwardly of the opposite end, a first channel in the inner surface of said rear plate communicating with said fourth aperture and extending longitudinally to a point above said first aperture, said rear plate having a recess in the inner surface below said third aperture, a second channel in the inner surface of said rear plate communicating with said second aperture and extending longitudinally to a point below said fourth aperture, said rear plate having a passage therein connecting said second channel and said recess, a third longitudinally extending channel in the inner surface of said front plate in registration with said first channel, said front plate having a first discharge opening in alignment with said first aperture, a first core nozzle extending through said first discharge opening and connecting to said first aperture, a first co-axial sleeve nozzle received over said first core nozzle and connected to said first discharge opening, said front plate having a first enlarged recess in the inner surface communicating with said first discharge opening and said first and third channels, said front plate having a second discharge opening in alignment with said recess in said rear plate, a second core nozzle extending through said second discharge opening and connected to said recess in said rear plate, a second co-axial sleeve nozzle received over said second core nozzle and connected to said second discharge opening, said front plate having a second enlarged recess in the inner surface communicating with said second discharge opening and said third aperture and a fourth longitudinally extending channel in the inner surface of said front plate in registration with said second channel.

2. Apparatus for simultaneously filling a pair of tubular casings to provide a food product in each casing having a core of one food material and a surrounding sleeve of another food material, said apparatus including a food material distributor comprising front and rear plates detachably secured together in face to face relationship, said rear plate having a pair of inlets for said one food material comprising first and second apertures adjacent one end, said rear plate having a pair of inlets for said other food material comprising third and fourth apertures adjacent the opposite end, a first channel in the the inner surface of said rear plate communicating with said fourth aperture and extending longitudinally to a point above said first aperture, rear plate having a recess in the inner surface below said third aperture, a second channel in the inner surface of said rear plate communicating with said second aperture and extending longitudinally to a point below said fourth aperture, said rear plate having a passage connecting said second channel and said recess, a third longitudinally extending channel in the inner surface of said front plate in registration with said first channel, said front plate having a first discharge opening in alignment with said first aperture, a first core nozzle extending through said first discharge opening and connected to said first aperture, a first co-axial sleeve nozzle received over said first core nozzle and connected to said first discharge opening, said front plate having a first enlarged recess in the inner surface communicating with said first discharge opening and said first and third channels, said front plate having a second discharge opening in alignment with said recess in said rear plate, a second core nozzle extending through said second discharge opening and connected to said recess in said rear plate, a second co-axial sleeve nozzle received over said second core nozzle and connected to said second discharge opening, said front plate having a second enlarged recess in the inner surface communicating with said second discharge opening and said third aperture and a fourth longitudinally extending channel in the inner surface of said front plate in registration with said second channel.

3. Apparatus for simultaneously filling a pair of tubular casings to provide a food product in each casing having a core of one food material and a surrounding sleeve of another food material, said apparatus including a food material distributor comprising front and rear plates detachably secured together in face to face relationship, said rear plate having a pair of inlets for said one food material comprising first and second apertures, said rear plate having a pair of inlets for said other food material comprising third and fourth apertures, a first channel in the inner surface of said rear plate communicating with said fourth aperture and extending to a point above said first aperture, said rear plate having a recess in the inner surface below said third aperture, a second channel in the inner surface of said rear plate communicating with said second aperture and extending to a point below said fourth aperture, said rear plate having a passage connecting said second channel and said recess, a third channel in the inner surface of said front plate in registration with said first channel, said front plate having a first discharge opening in alignment with said first aperture, a first core nozzle extending through said first discharge opening and connected to said first aperture, a first co-axial sleeve nozzle received over said first core nozzle and connected to said first discharge opening, said front plate having a first enlarged recess in the inner surface communicating with said first discharge opening and said first and third channels, said front plate having a second discharge opening in alignment with said recess in said rear plate, a second core nozzle extending through said second discharge opening and connected to said recess in said rear plate, a second co-axial sleeve nozzle received over said second core nozzle and connected to said second discharge opening, said front plate having a second enlarged recess in the inner surface communicating with said second discharge opening and said third aperture and a fourth channel in the inner surface of said front plate in registration with said second channel.

4. Apparatus for simultaneously filling a pair of tubular casings to provide a food product in each casing having a core of one food material and a surrounding sleeve of another food material, said apparatus including a food material distributor comprising front and rear plates detachably secured together in face to face relationship, said rear plate having a pair of inlets for said one food material comprising first and second apertures, said rear plate having a pair of inlets for said other food material comprising third and fourth apertures, a first channel in the inner surface of said rear plate communicating with said fourth aperture and extending to a point above said first aperture, said rear plate having a recess in the inner surface below said third aperture, a second channel in the inner surface of said rear plate communicating with said second aperture and extending to a point below said fourth aperture, said rear plate having a passage connecting said second channel and said recess, a third channel in the inner surface of said front plate in registration with said first channel, said front plate having a first discharge opening in alignment with said first aperture, a first core nozzle extending through said first discharge opening and connected to said first aperture, a first sleeve nozzle received over said first core nozzle and connected to said first discharge opening, said front plate having a first enlarged recess in the inner surface communicating with said first discharge opening and said first and third channel, said front plate having a second discharge opening in alignment with said recess in said rear plate, a second core nozzle extending through said second discharge opening and connected to said recess in said rear plate, a second sleeve nozzle received over said second core nozzle and connected to said second discharge opening, said front plate having a second enlarged recess in the inner surface communicating with said second discharge opening and said third aperture and a fourth channel in the inner surface of said front plate in registration with said second channel.

5. Apparatus for simultaneously filling a pair of tubular casings to provide a food product in each casing having a core of one food material and a surrounding sleeve of another food material, said apparatus including a food material distributor comprising front and rear plates detachably secured together in face to face relationship, said rear plate having a pair of inlets for said one food material comprising first and second apertures, said rear plate having a pair of inlets for said other food material comprising third and fourth apertures, a first channel in the inner surface of said rear plate communicating with said fourth aperture and extending to a point above said first aperture, said rear plate having a first recess in the inner surface below said third aperture, a second channel in the inner surface of said rear plate communicating with said second aperture and extending to a point below said fourth aperture, said rear plate having a passage connecting said second channel and said first recess, a third channel in the inner surface of said front plate in registration of said first channel, said front plate having a first discharge opening in alignment with said first aperture, a first core nozzle extending through said first discharge opening and connected to said first aperture, a first sleeve nozzle received over said first core nozzle and connected to said first discharge opening, said front plate having a second recess in the inner surface communicating with said first discharge opening and said first and third channels, said front plate having a second discharge opening in alignment with said first recess in said rear plate, a second core nozzle extending through said second discharge opening and connected to said first recess in said rear plate, a second sleeve nozzle received over said second core nozzle and connected to said second discharge opening, said front plate having a third recess in the inner surface communicating with said second discharge opening and said third aperture and a fourth channel in the inner surface of said front plate in registration with said second channel.

6. Apparatus for simultaneously filling a pair of tubular casings to provide a food product in each casing having a core of one food material and a surrounding sleeve of another food material, said apparatus including a food material distributor comprising front and rear plates detachably secured together in face to face relationship, said rear plate having a pair of inlets for said one food material comprising first and second apertures, said rear plate having a pair of inlets for said other food material comprising third and fourth apertures, a first channel in the inner surface of said rear plate communicating with said fourth aperture and extending to a point above said first aperture, said rear plate having a first recess in the inner surface below said third aperture, a second channel in the inner surface of said rear plate communicating with said second aperture and extending to a point below said fourth aperture, said rear plate having a passage connecting said second channel and said first recess, a third channel in the inner surface of said front plate in registration with said first channel, said front plate having a first discharge opening in alignment with said first aperture, a first core nozzle extending through said first discharge opening and connected to said first aperture, a first sleeve nozzle received over said core nozzle and connected to said first discharge opening, said front plate having a second recess in the inner surface communicating with said first discharge opening and said first and third channels, said front plate having a second discharge opening in alignment with said first recess in said rear plate, a second core nozzle extending through said second discharge opening and connected to said first recess in said rear plate, a second sleeve nozzle received over said second core nozzle and connected to said second discharge opening and said front plate having a third recess in the inner surface communicating with said second discharge opening and said third aperture.

7. Apparatus for simultaneously filling a pair of tubular casings to provide a food product in each casing having a core of one food material and a surrounding sleeve of another food material, said apparatus including a food material distributor comprising front and rear plates detachably secured together in face to face relationship, said rear plate having a pair of inlets for said one food material comprising first and second apertures, said rear plate having a pair of inlets for said other food material comprising third and fourth apertures, a first channel in the inner surface of said rear plate communicating with said fourth aperture and extending to a point above said first aperture, said rear plate having a first recess in the inner surface below said third aperture, a second channel in the inner surface of said rear plate communicating with said second aperture and extending to a point below said fourth aperture, said rear plate having a passage connecting said second channel and said first recess, said front plate having a first discharge opening in alignment with said first aperture, a first core nozzle extending through said first discharge opening and connected to said first aperture, a first sleeve nozzle received over said first core nozzle and connected to said first discharge opening, said front plate having a second recess in the inner surface communicating with said first discharge opening and said first channel, said front plate having a second discharge opening in alignment with said first recess in said rear plate, a second core nozzle extending through said second discharge opening and connected to said first recess in said rear plate, a second sleeve nozzle received over said second core nozzle and connected to said second discharge opening and said front plate having a third recess in the inner surface communicating with said second discharge opening and said third aperture.

References Cited in the file of this patent

UNITED STATES PATENTS

| 1,107,184 | Priban | Aug. 11, 1914 |
|---|---|---|
| 1,602,331 | Britton | Oct. 5, 1926 |
| 2,330,496 | Kidd | Sept. 28, 1943 |
| 2,568,491 | Edwards | Sept. 18, 1951 |
| 2,708,414 | Gumer | May 17, 1955 |